US006594198B2

(12) United States Patent
Amaral et al.

(10) Patent No.: US 6,594,198 B2
(45) Date of Patent: Jul. 15, 2003

(54) DIGITAL SIGNAL DEMODULATOR CALIBRATION SYSTEM AND METHOD FOR OPTICAL HYDROPHONES

(75) Inventors: Michael Amaral, Westport, MA (US); Gregory H. Ames, Wakefield, RI (US); Antonio L. Deus, III, Saunderstown, RI (US); Christopher M. Hansen, Hope Valley, RI (US); David J. Moretti, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/977,904

(22) Filed: Oct. 10, 2001

(65) Prior Publication Data

US 2003/0067841 A1 Apr. 10, 2003

(51) Int. Cl.$^{7}$ ............................ H04B 17/00; H04R 7/00
(52) U.S. Cl. ......................................... 367/13; 367/149
(58) Field of Search .................... 367/13, 149; 342/194

(56) References Cited

U.S. PATENT DOCUMENTS 4,682,117 A * 7/1987 Gibson ....................... 329/302
4,977,546 A * 12/1990 Flatley et al. ............... 367/140
5,313,266 A * 5/1994 Keolian et al. ........ 250/227.27
5,345,172 A * 9/1994 Taguchi et al. ............. 324/309
H1619 H * 12/1996 McCord et al. ............... 367/13
5,809,087 A * 9/1998 Ashe et al. ................. 342/174
5,894,280 A * 4/1999 Ginetti et al. ............... 341/118
5,903,350 A * 5/1999 Bush et al. ................. 356/478

* cited by examiner

*Primary Examiner*—Daniel T. Pihulic
(74) *Attorney, Agent, or Firm*—James M. Kasischke; Michael F. Oglo; Jean-Paul A. Nasser

(57) ABSTRACT

A system for digitally demodulating optical hydrophone signals is provided. The system includes an optical hydrophone connected to an analog-to-digital converter and further connected to a digital signal processor. Within the digital signal processor, a demodulator is calibrated by a preferred automatic calibration circuit such that mixer frequencies are coherently mixed with the incoming acoustic signals received by the hydrophone. The automatic calibration circuit preferably determines an extreme case of phase offset by following a programmable routine including a series of tests. After the extreme case is detected, the precise phase calibration is known and provided to the demodulator mixer tables. The automatic calibration circuit can be utilized for automatic calibrations of multisensor systems containing large numbers of hydrophones.

11 Claims, 5 Drawing Sheets

DIGITAL SIGNAL DEMODULATOR CALIBRATION SYSTEM AND METHOD FOR OPTICAL HYDROPHONES

CROSS REFERENCE TO OTHER PATENT APPLICATIONS

Not applicable.

STATEMENT OF THE GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The invention described herein relates generally to hydrophone signal processing and, more particularly, to systems and methods for calibrating optical hydrophone detector systems.

(2) Description of the Prior Art

A typical optical hydrophone has a reference leg and a sensing leg. The sensing leg is formed by wrapping a fiber optic cable around a compliant mandrel. The reference leg is formed by wrapping a length of fiber optic cable around a noncompliant mandrel. During operation, light is pulsed down both fiber legs and reflected by mirrors imbedded in the ends of the fibers. The output of both legs, the reference and sensing legs, are summed at a node forming an interferometer. This summation produces a phase modulating signal of the form $$O=A+B\cos\theta(t) \quad (1)$$

where

A & B=Constants proportional to the input power, and

θ(t)=Phase difference between the interferometer sensor and reference leg.

Typically, a sinusoidal modulating frequency is injected through a piezoelectric element on the reference leg of the interferometer. The output signal is given by $$O=A+B\cos(C\cos\omega_o(t)+x(t)) \quad (2)$$

where x(t)=Signal of interest,

C=Modulating signal amplitude, and $\omega_o$=Modulating signal frequency.

Analog demodulators are used to process the output signal. These demodulators are complex custom-built hardware, requiring both expensive and time-consuming calibration. What is needed is an improved system for using programmable digital signal processor for demodulation and for calibration.

Patents that show attempts to solve the above and other related problems are as follows:

U.S. Pat. No. 4,977,546, issued Dec. 11, 1990, to Flatley et al., discloses a system for signal stabilizing in-phase modulated optical hydrophone arrays employing interferometry with homodyne detection. Phase stabilization is accomplished by modulating the input laser signal in proportion to variations in the output of an optical transducer to balance the output phase so that the fringes are kept at optimum position. Additionally, fluctuations in light intensity are compensated for so that a photodetector responds only to phase shift variations. The technique used is to split the input beam into signal and reference beams using a beam divider, exposing the signal beam to the acoustic pressure of interest, recombining the signal beam with the reference beam, detecting the combined beams and filtering the resulting signal to separate out the acoustic information of interest from the phase shift and light intensity portions used to stabilize the input beam. The acoustic information is processed and the phase shift and light intensity information provides a feedback signal for use in input beam stabilization.

U.S. Pat. No. 5,313,266, issued May 17, 1994, to Keolian et al., discloses a highly sensitive optical fiber interferometer sensor comprising a laser light source, a [2×2] optical fiber coupler to split the beam in two, a differential transducer which converts a signal of interest into optical phase shift in the laser light transmitted through the two optical fibers in the interferometer and a [3×3] optical fiber complex which recombines the two beams, producing interference which can be electronically detected. The use of the [3×3] coupler permits Passive Homodyne demodulation of the phase-modulated signals provided by the interferometer without feedback control or modulation of the laser itself and without requiring the use of electronics within the interferometer.

U.S. Pat. No. 5,345,172, issued Sep. 6, 1994, to Taguchi et al., discloses a means to accomplish double-slice imaging by a nuclear magnetic resonance (NMR) imaging apparatus having an ordinary radio frequency magnetic field generator, two radio frequency magnetic field waveforms are used and slices are separated by subsequent calculation. More definitely, two slice portions are excited in a REAL direction by a COS waveform and are excited in an IMAG direction by a SIN waveform. When one of the slices is S1 with the other being S2, the signal SC when the COS waveform is used is S1+S2 while the signal SS when the SIN waveform is used is i.S1−i.S2. Therefore, the calculation for separating the slices proves SC+i.SS and SC−i.SS.

U.S. Pat. No. 5,809,087, issued Sep. 15, 1998, to Ashe et al., discloses an architecture for remote calibration of coherent systems using coherent reference and calibration signals that contain the relative amplitude and phase information desired in the calibration process. Circuitry extracts the relevant amplitude and phase information needed for the calibration while compensating for non-synchronized clocks and the effects of Doppler shifts due to relative motion of the transmitting and receiver platforms. The coherent detection architectures can be used effectively with any scheme designed to determine the relative amplitudes and phases of the signals emitted from the different elements of the phased array. These architectures are particularly applicable to coherent encoding calibration procedures that enhance the effective SNR by using coherent transmission of orthogonal transform encoded signals from N elements of the phased array. In an example calibration architecture, coherent elemental signals are encoded using controlled switching of the delay phase control circuits themselves to effectively generate a perfect orthogonal transform encoding of the signal vectors, even though the control circuits may be imperfect; no additional encoding hardware is required. The switching is dictated by matrix elements of an N×N invertible binary matrix, with the most preferred embodiment being an orthogonal binary matrix, i.e., a Hadamard matrix. The coherent signals are decoded with the inverse of the same binary matrix used in the control circuit encoding.

U.S. Pat. No. 5,894,280, issued Apr. 13, 1999, to Ginetti et al., discloses a digital to analog converter (DAC) offset autocalibration system in a digital synthesizer integrated circuit. The present invention includes a DAC coupled to a filter. The input of the DAC accepts digital values for conversion to an analog signal. The output of the DAC is coupled to the input of the filter. The filter smoothes the analog signal received from the DAC. A switch is coupled to the filter output to receive the analog signal. A comparator is coupled to the switch. The input of the comparator receives the analog signal from the filter output via the switch. An autocalibration control circuit is coupled to the output of the comparator, to the switch, and to the DAC. The autocalibration control circuit is adapted to input a value to the DAC in order to determine an offset correction from the output of the comparator and adjust the analog signal using the offset correction.

U.S. Pat. No. 5,903,350, issued May 11, 1999, to Bush et al., discloses an apparatus and method providing wide dynamic range measurements of the input phase to an interferometer using a phase generated carrier. This invention is useful when utilizing time multiplexing to demodulate a series of interferometers. A modulation drive output is provided by the invention and maintained under operation at the optimum amplitude by an internal feedback loop. The resulting highly stable system can be fabricated from an analog to digital converter, a digital signal processor, and a digital to analog converter making low cost open loop demodulators a reality.

U.S. Pat. No. H1619, issued Dec. 3, 1996, to McCord et al., discloses a frequency modulated monitor hydrophone system which is used to monitor low frequency sound signals where cross-talk coupling is a problem. The invention consists of a hydrophone, preamplifier and receiver which includes a control group. The hydrophone comprises an acoustic sensor and low-noise preamplifier utilizing dynamic range compression to condition the electrical acoustic sensor signal before it is frequency modulated (FM) and applied to a coaxial cable. At the remotely located receiver, the FM signal from the hydrophone preamplifier is filtered to remove undesirable signals, such as audio spectrum crosstalk and out of band signals. The partially recovered audio signal is decompressed utilizing dynamic range decompression, amplified, and output for utilization or recordation by an operator. A calibration circuit provides a continuity or partial calibration check for the hydrophone by applying a signal of predetermined frequency and voltage to the hydrophone preamplifier and sensor. A microprocessor in the control group periodically reads the input signal and controls the various receiver and hydrophone preamplifier circuits. Selected controls on the panel of the control group allow the operator to set gains, perform the calibration procedures, and monitor system performance.

The above-cited prior art does not show a highly reliable means for accurately calibrating a digital optical hydrophone demodulator. Consequently, those skilled in the art will appreciate the present invention that addresses the above and other problems.

SUMMARY OF THE INVENTION

It is an object of the present invention to provide an improved calibration module for a demodulator which may be utilized with an optical hydrophone system.

It is another object of the present invention to provide a calibration module as aforesaid which is highly reliable for determining an accurate phase alignment between a carrier and a received signal.

It is a further object of the present invention to provide a calibration module as aforesaid which is completely automatic and may be utilized within a multisensor system comprising large numbers of hydrophones.

These and other objects, features, and advantages of the present invention will become apparent from the drawings, the descriptions given herein, and the appended claims. It will be understood that above listed objects and advantages of the invention are intended only as an aid in understanding aspects of the invention, are not intended to limit the invention in any way, and do not form a comprehensive list of objects, features, and advantages.

In accordance with the present invention, a process is provided for calibrating an optical hydrophone demodulator by determining a phase for phase alignment between a carrier and a received signal. The optical hydrophone demodulator produces a first output and a second output such that the first output is in phase quadrature with respect to the second output. The process may comprise one or more steps such as, for instance, comparing the first output with respect to the second output by varying the phase until a plot of the first output with respect to the second output is a straight line, storing a value of the phase when the plot of the first output with respect to the second output is a straight line, and adjusting the value of the phase by a predetermined amount to produce an adjusted phase such that the received signal is in phase with the carrier.

Other steps may include providing the adjusted phase to a first mixer utilized for producing the first output and providing the adjusted phase to a second mixer utilized for producing the second output. In a preferred embodiment, the first mixer comprises a first mixer table and the second mixer comprises a second mixer table.

Additional steps of the invention may includes determining a ratio of a maximum of the first output with respect to the second output, adjusting the phase to reduce the ratio below a predetermined value, maintaining a count related to a number of adjustments to the phase, comparing the ratio before and after a step of adjusting the phase, utilizing the count and the step of comparing to determine when to make a series of fine adjustments to the phase.

The process also provides for utilizing the adjusted phase for determining a scaling factor for the first output and the second output.

In other words, a programmed process is provided for calibrating an optical hydrophone demodulator comprising one or more steps such as, for instance, determining a ratio of a maximum value of the first output with respect to a maximum value of the second output, reducing the ratio by making adjustments to the phase in steps until a minimum value of the ratio is determined, storing a value of the phase when the minimum value of the ratio is determined, and adjusting the value of the phase by a predetermined amount to produce an adjusted phase such that the received signal is in phase with the carrier.

Additional steps may include determining a scalar attribute by measuring the ratio with the adjusted phase, and utilizing the scalar attribute for adjusting an amplitude of the first output and the second output.

The method may also comprise providing the adjusted phase to a first mixer utilized for producing the first output, and providing the adjusted phase to a second mixer utilized for producing the second output.

The present invention provides a calibration processor operable for automatically calibrating the optical hydrophone demodulator by determining a phase for phase alignment between a carrier and a received signal wherein the processor comprises one or more elements such as, for instance, at least one offset adjustment for varying a phase offset, a counter for counting the number of times the at least one offset adjustment varies the phase offset, and an initializer for setting the counter at an initial value.

Other elements may preferably comprise a plurality of decision modules for making decisions regarding a ratio related to the first output and the second output. In a preferred embodiment, the counter and the offset adjustment are operative in response to at least one of the plurality of decision modules. The plurality of decision modules may comprise a first decision module for determining whether the ratio is less than a predetermined number, a second decision module for determining whether the ratio increases or decreases after an offset adjustment is made, and a third decision module for determining whether the counter has a count greater than a predetermined value.

Other elements may include a first offset adjustment for making a course phase offset adjustment, and a second offset adjustment for making a fine phase offset adjustment wherein the course phase offset adjustment changes the phase offset by a greater amount than the fine phase offset adjustment. A third phase-offset adjustment may be provided for making a predetermined offset adjustment in response to at least one of the plurality of decision modules to thereby determine a value for the phase.

A scalar determination module may be provided for determining a scalar value related to the first output and the second output wherein the scalar determination module utilizes the phase for determining the scalar value.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts and wherein.

BRIEF DESCRIPTION OF THE PREFERRED EMBODIMENTS

Figure 1:
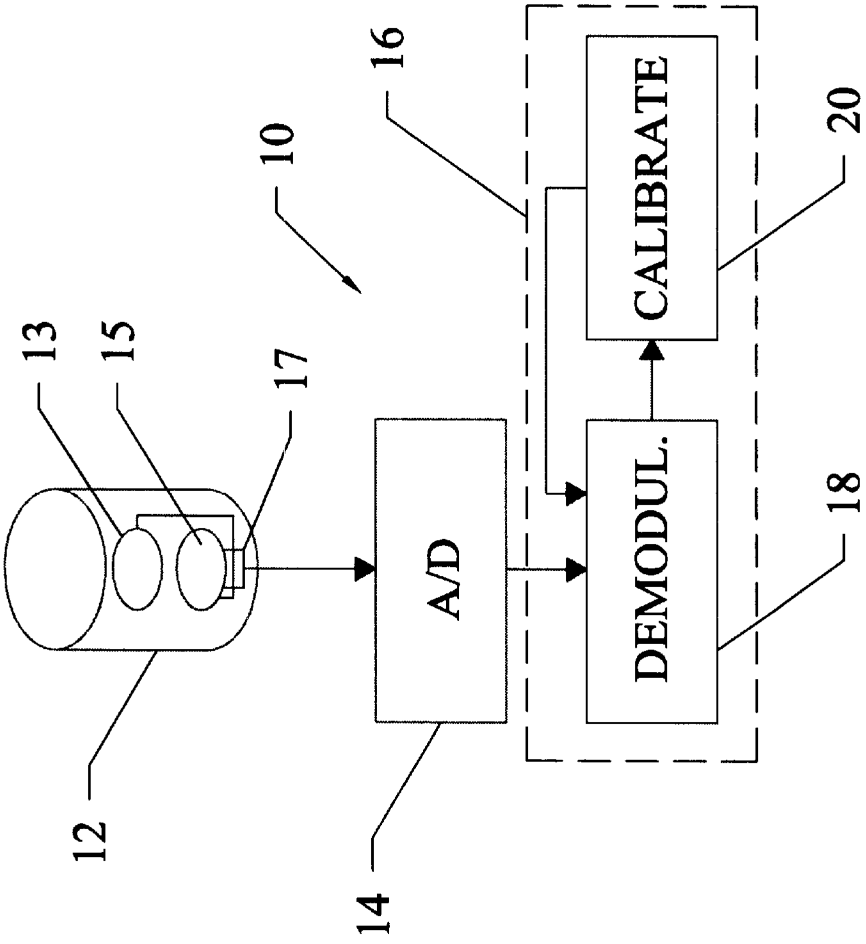
FIG. 1 is a block diagram showing the major components of the digital demodulation system.

Referring now to FIG. 1, the system for digital signal demodulation, designated generally by the reference numeral 10, is shown with its major components. The system 10 comprises an optical hydrophone 12 having a first optical leg 13 comprising an optical cable wound on a compliant mandrel; the first optical leg being the sensing leg, and a second optical leg 15 having an optical cable wound on a non-compliant mandrel, the second optical leg being the reference leg. The signals from the two legs are combined using an interferometer section 17, which is connected to an analog-to-digital (A/D) converter 14. The output of the A/D converter 14 is fed to a digital signal processor (DSP) 16. The DSP 16 incorporates two custom modules, the basic demodulator 18 and the automatic calibration module 20. These two modules control processing of the acoustic signal and make up a processing module which may be implemented in software or hardware and which can physically reside within the DSP 16. The operation of the basic demodulator 18 may be more fully seen in FIG. 2. An interferometer output 24 is converted to an electrical signal and sent to the A/D converter 14. The A/D converter 14 samples the converted data at a high rate storing approximately ten times the number of data points needed to process the incoming signals based on the Nyquist thereon sampling rate. Scaling factor Fs, as designated at 26, is used to determine an amplitude of the digitized signal. The stored digitized data is mixed using two mixer tables, a first mixer table 28 having a mixing frequency, ω, where ω is the modulating frequency injected in the reference leg of the interferometer, and a second mixer table 30 having a mixing frequency of 2ω. The signals at ω and 2ω are in quadrature. The incoming signals from the A/D converter 14 must be coherently mixed with the mixer table frequencies, ω and 2ω. The coherent mixing is accomplished by phase calibration 32 as more fully described in FIG. 3. After mixing the signals are filtered through low-pass filters 34 (filters having similar characteristics to Martinez and Parks™ filters are preferable.) and scaled by scaling factor/decimation factor 36 which is designated in FIG. 2 as Fs/d. As the sampling rate for providing a digital representation of the sine wave 38 and cosine wave 40 are oversampled by a factor of ten (ten times the needed number of data points are collected), decimation allows a division of the excess data points to provide the necessary number of points. Thereafter, the signal is normalized by the normalizer 42. Each signal leg is then differentiated using a low-pass differentiator 44 and 46 and the results are cross-multiplied and combined. The output is then high pass filtered through high-pass integrator 48 yielding the signal of interest x(t) 50.

Figure 3:
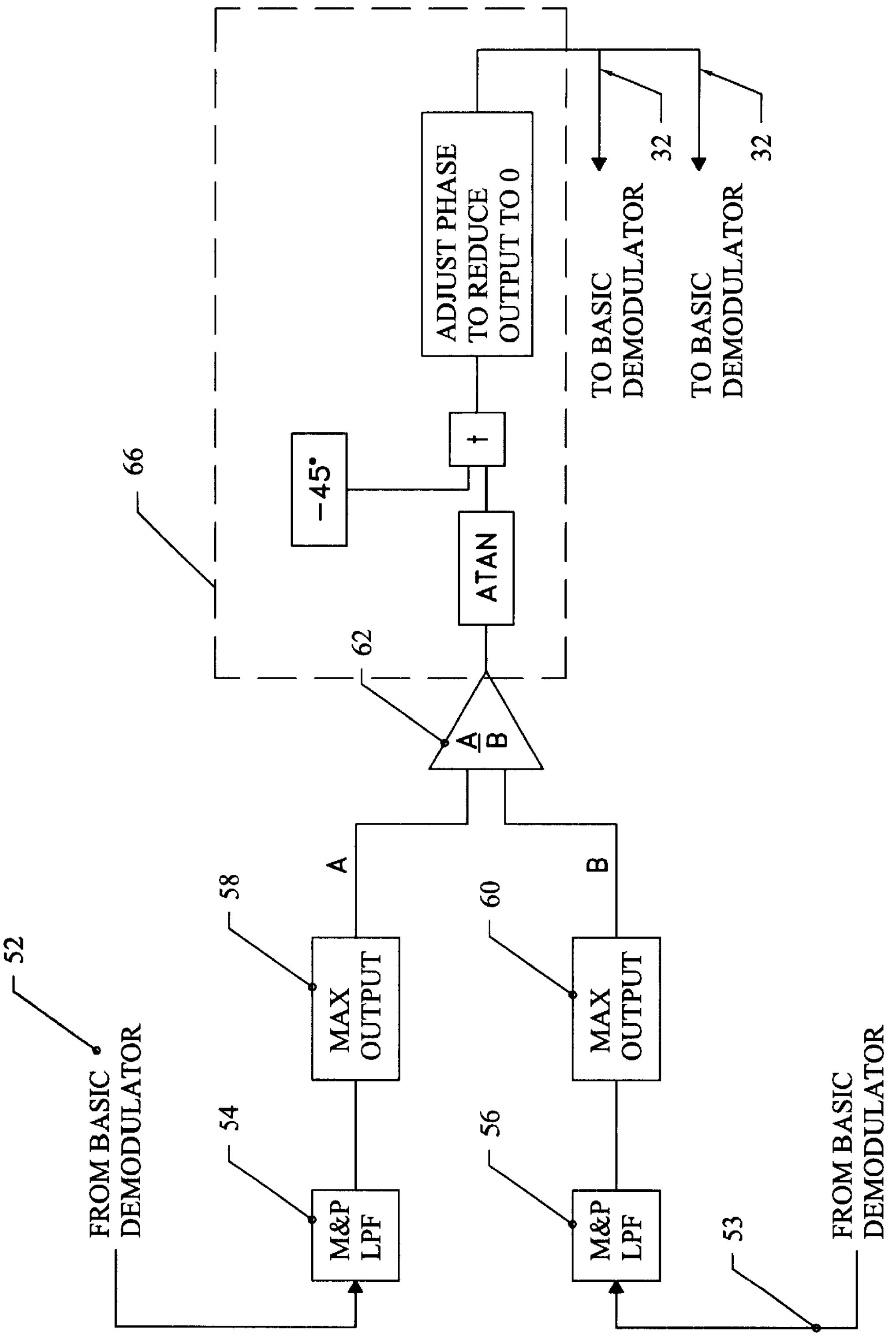
FIG. 3 is a schematic showing an earlier developed calibration process for the demodulator which is not as reliable as the presently preferred calibration system of the present invention.

As the system will operate only when the mixer frequencies are coherent with the incoming waveform, a calibration circuit, is used to provide coherence. A previously developed calibration circuit is shown in FIG. 3. However, a presently preferred calibration circuit is illustrated by FIG. 5 with reference to FIG. 4. The main difference between the presently preferred calibration circuit and the previously developed circuit is shown within dashed box 66 whereby in the presently preferred embodiment, the processing routine of FIG. 5 is utilized within box 66.

The signals 52 and 53 received from the basic demodulator are processed using the Martinez and Parks™ low-pass filters, 54 and 56, respectively. Thereafter, the signal maximums are selected, represented by Max Output 58 and Max Output 60. The signals are then processed by an operational amplifier 62 receiving the first and second output maximums and an iteration to provide an inverse tangent output of zero, thereby usually, but not always, causing coherent mixing of the received signals in the basic demodulator. When the output is not zero, feedback 32 to the basic demodulator continues and when the output reaches zero, no further phase adjustment occurs.

The phase calibration circuit of FIG. 3 establishes a ratio of Max(cos(2ω))/Max(sin(ω)). The arctangent is then found to convert this ratio into an angle. The phase calibration circuit of FIG. 3 then subtracts 45 degrees from the angle and increments the phase as necessary to bring the phase to 0 degrees. The so determined phase is then fed to the demodulator as feedback 32. While this circuit is purely automatic, sometimes an error occurs which is best illustrated by viewing FIG. 4.

Figure 4:
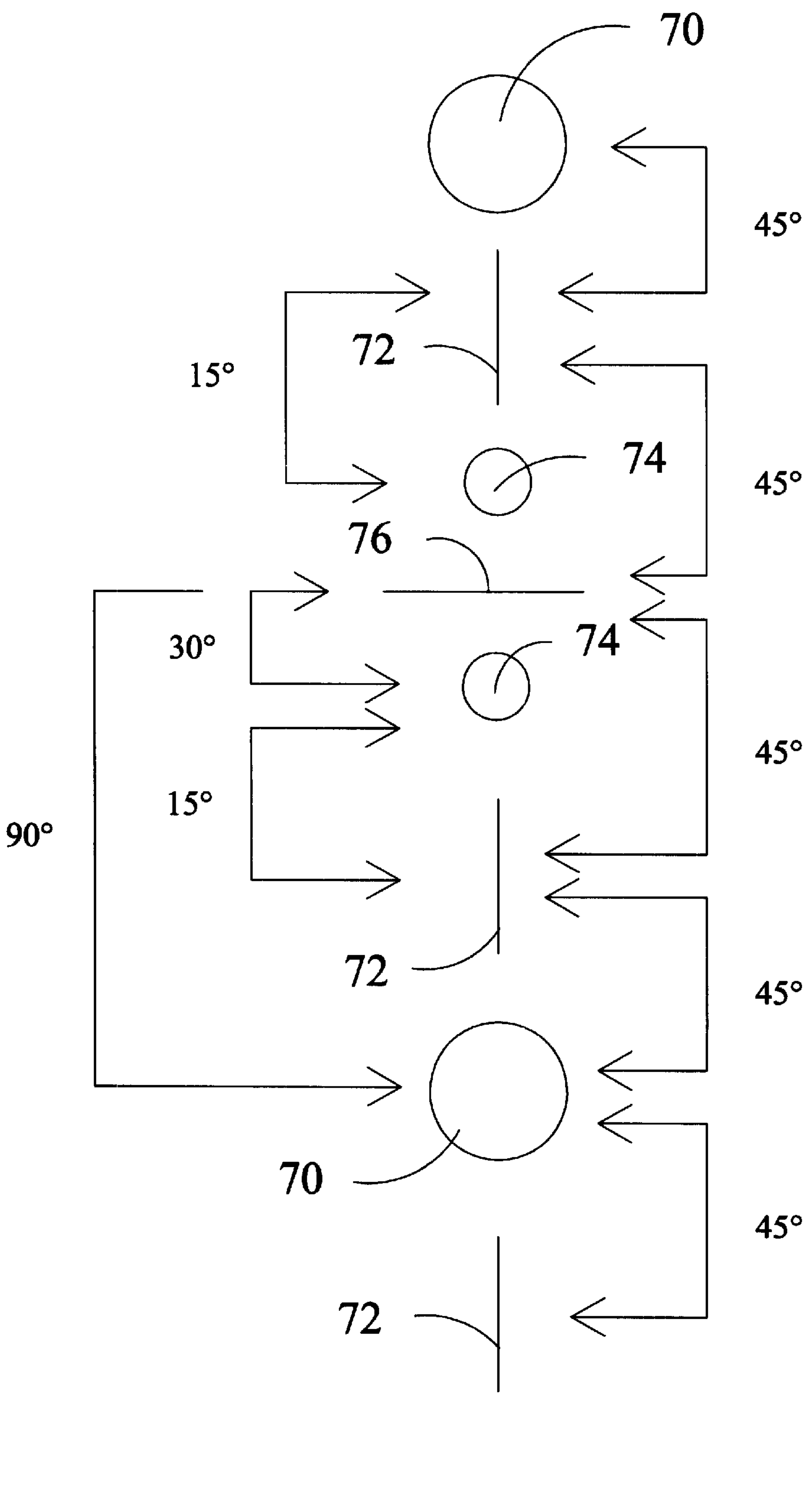
FIG. 4 is a diagram which conveniently illustrates signal patterns related to phase changes in accord with the present invention.
Figure 5:
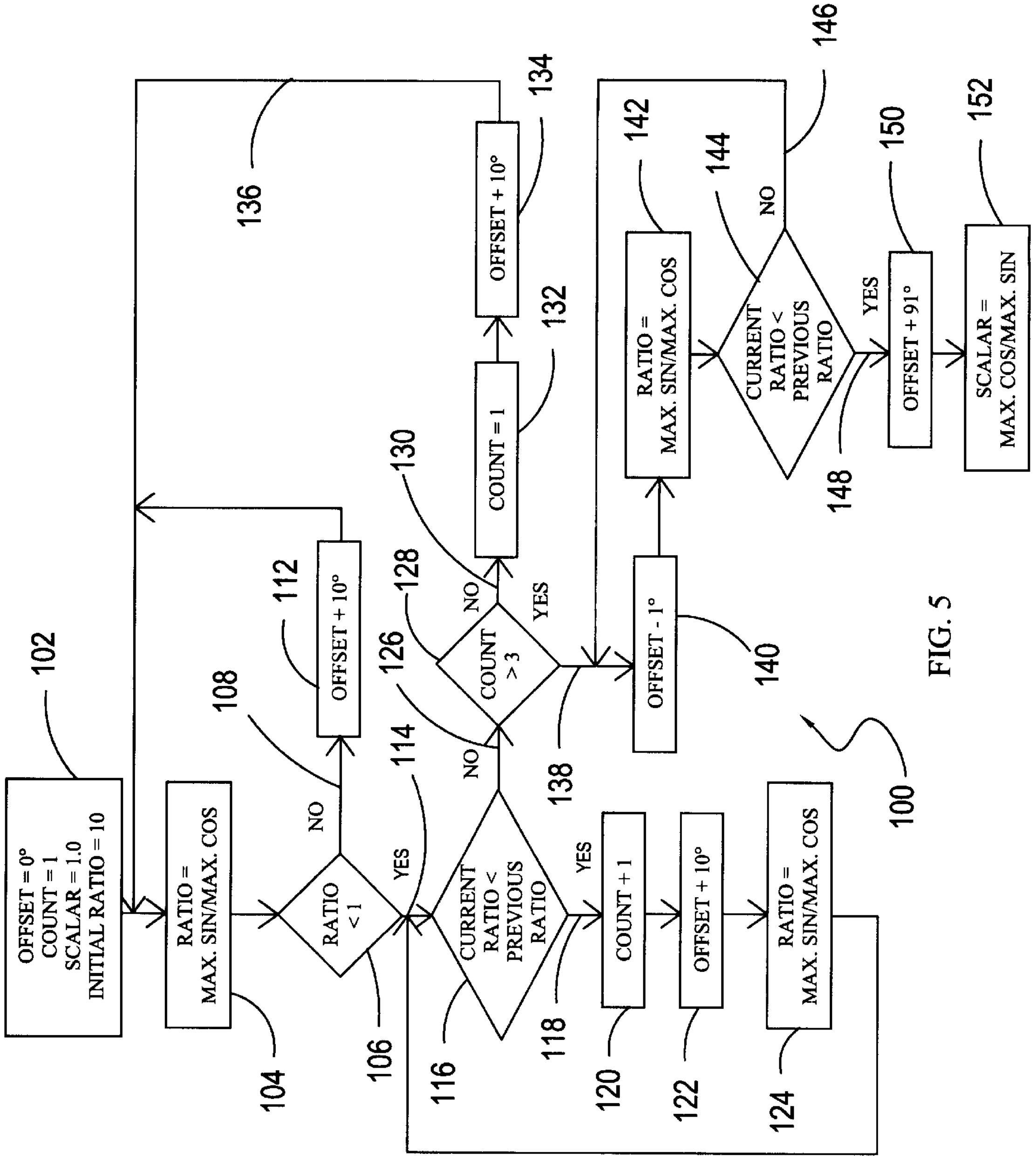
FIG. 5 is a flow chart diagram for a presently preferred software calibration routine in accord with the present invention.

FIG. 4 shows snapshots of the extreme cases of a plot of the sin(ω) channel (x-axis) vs. the cos(2ω) (y-axis) as the phase changes. During this process and starting at the top, the plot appears as a large circle as indicated at 70, whereupon a 45 degrees phase difference produces a vertical line as indicated at 72, whereupon a 15 degrees phase change produces a small circle as indicated at 74, whereupon a 30 degrees phase change produces a horizontal line as indicated at 76, whereupon a 30 degrees phase change produces a small circle 74 again, whereupon a 15 degrees phase change produces a vertical line 72 again, whereupon a 45 degrees phase change produces a large circle as indicated at 70 again, whereupon a 45 degrees phase change produces a vertical line 72 again, and so forth. The large circle is the plot produced of the desired precise phase alignment. The problem with the circuit of FIG. 3 is that sometimes instead of finding the large circle, the small circle will satisfy the calibration routine thus producing, in some cases, a 60 degree phase calibration error.

The presently preferred calibration technique shown in FIG. 5, and suggested by the snapshots of plots versus phase shown in FIG. 4, corrects the problems of occasional error in the calibration circuit of FIG. 3. In the calibration process of FIG. 5, the correct phase is found by a technique of locating the extreme phase offset, as indicated by horizontal line 76 in FIG. 4. Then, because the extreme phase offset is 90 degrees away from the aligned phase, as indicated by large circle 70 in FIG. 4, an exact adjustment is obtained by simply adding 90 degrees to thereby obtain a precisely aligned phase.

The extreme phase is found by a stepped process, as indicated in process 100 in FIG. 5, whereby the phase is adjusted in steps until the Max(cos(2ω))/Max(sin(ω)) is minimized to obtain the horizontal vertical line 76. The scalar attribute or scaling factor/decimation factor 36 which is designated in FIG. 2 as Fs/d, can also be found utilizing process 100, if desired.

In FIG. 5, initial values are utilized, which may be the same as those that are arbitrarily indicated at 102 whereby the phase offset is zero, the scalar is 1.0, the initial count is 1 (as will always be the case when initializing process 100), and the initial ratio is 10.0. The maximum sin and cosine values are determined and the ratio is found as indicated in FIG. 3 at 62 and also as indicated at 104 in FIG. 5 whereby the ratio=Max sin/Max cos. Decision box 106 determines whether the ratio is greater than one or not. If ratio is greater than one at the NO result line 108, then the sin vs. cosine plot yields an ellipse in the vertical direction. Therefore, process 100 adds ten degrees to the phase offset as indicated at 112 and loops through the above-described process once more.

Eventually, the ratio will be less than one as indicated at the YES result line 114 whereupon the circle has become elliptical in the horizontal direction. Test box 116 then determines whether the current ratio is less than the previous ratio. So long as the YES result line is taken as indicated at 118, then the Count will be increased by one as indicated at 120, the offset will continue to increase by 10 degrees as indicated at 122, and the ratio will be recomputed as indicated at 124. If the current ratio is greater than the previous ratio, then the NO result line is taken at 126.

To avoid the problem of the particular case of the small circle calibration error which may occur in the circuit of FIG. 3, process 100 now checks at test box 128 whether the count is greater than three. This step negates accidentally calibrating to small circle 74 which is 30 degrees phase shift from horizontal line 76. A count greater than three indicates more than 30 degrees phase shift has been added after the circle became elliptical in the vertical direction. If the count at this point is less than three as indicated at NO line 130, then the count is reset to 1 as indicated at 132, the offset increased by ten degrees as indicated at 134, and process 100 begins once again as indicated by return line 136.

Figure 2:
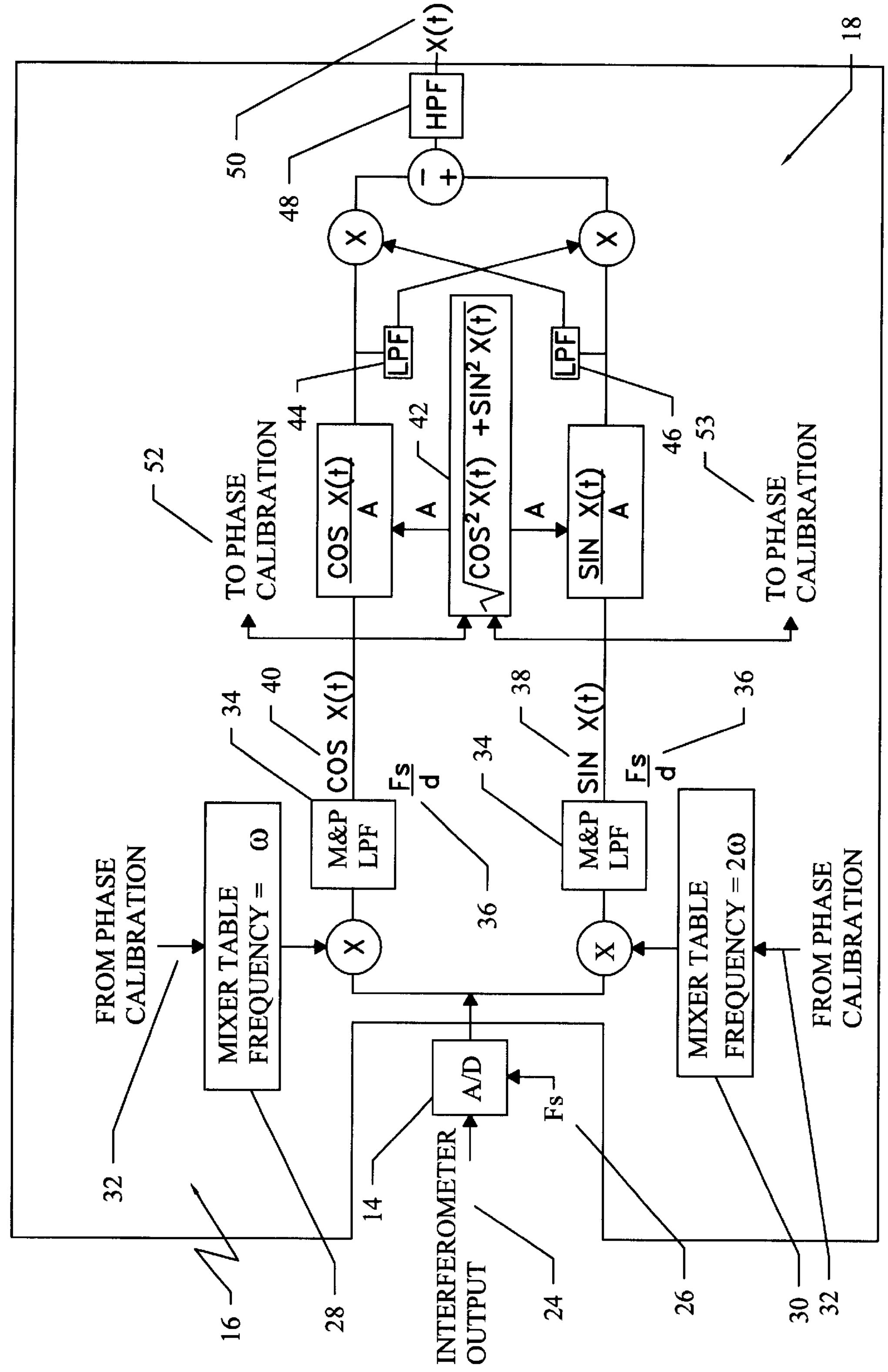
FIG. 2 is a schematic showing the process of the demodulation.

After the third offset increment is produced at 122, and the ratio now increases from the previous ratio value to produce a NO result at 126, then the horizontal line has been passed over and the result of test box 128 will be YES as indicated at 138. A fine adjustment is now made to find the horizontal line. Thus, the offset is reduced by one degree as indicated at 140 and then the ratio is determined again as indicated at 142. So long as test box 144 determines that the current ratio is less than the previous ratio as indicated by NO line 146, then the phase continues to be reduced by one degree. If the new ratio is greater than the old ratio as indicated by YES line 148, then the horizontal line extreme case has been found. Step 150 adds ninety degrees offset plus the one-degree by which step 140 caused test box 144 to provide a YES answer for a total of ninety-one degrees. Thus, effectively at this point, process 100 has located horizontal line 76 as shown in FIG. 4 and added ninety degrees to obtain large circle 70, which is the precise phase angle calibration desired. This value is then supplied by line 32 to the basic demodulator as indicated in FIG. 2 and FIG. 3. Essentially, process 100 replaces portion 66 of the calibration circuit of FIG. 3 to thereby more reliably providing an automatic calibration of the optical hydrophone system of FIG. 1.

At step 152, new scalar values for use at 26 and 36 in FIG. 2 can be determined by calculating the maximum sin and cosine values. The new scalar can be found by the letting the scalar=cos/sin. These values can be utilized in setting the gains of the low-pass filter outputs 34.

The features and advantages of the system are numerous. The process of the present invention can be implemented such that the calibration of the optical hydrophone is done automatically without operator intervention. Moreover, the system of the present invention avoids locking onto the wrong mixer phase as was occasionally a problem in the previous system of FIG. 3. The advantages are extremely important in a multisensor system where the manual calibration of large numbers of hydrophones is excessively time consuming. Using the demodulation system, standard commercial off-the-shelf digital signal processors can be used to demodulate the acoustic signal from an optical hydrophone. Thus, the system provides a built-in means of automatically calibrating the system, thereby maintaining the signal mixing coherence. In addition, the normalization function automatically adjusts the gain of the system as needed.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An automated process for aligning phases between a carrier signal and a received signal in a coherent demodulator utilizing a first mixer and a second mixer having a first output in phase quadrature with respect to a second output, said process comprising:

producing an extreme phase adjustment by varying the phase between said first output and said second output, said extreme phase adjustment having a plot indicating that said first output and said second output are orthogonally out of phase;

storing a value of said extreme phase adjustment; and adjusting said value of said extreme phase adjustment by a predetermined amount to produce a phase adjusted received signal and a phase adjusted carrier signal.

2. The process of claim 1 further comprising:

providing said adjusted phase to said first mixer utilized for producing said first output; and providing said adjusted phase to said second mixer utilized for producing said second output.

3. The process of claim 2 further comprising utilizing a first mixer table with said first mixer and a second mixer table with said second mixer.

4. The process of claim 1 wherein said step of producing an extreme phase adjustment comprises:

finding a maximum of said first output;

finding a maximum of said second output;

determining a ratio of said first output maximum to said second output maximum; and adjusting said phase in steps to reduce said ratio below a predetermined value and give said extreme phase adjustment.

5. The process of claim 4 wherein said step of producing an extreme phase adjustment comprises:

maintaining a count of said steps of adjusting said phase; and comparing said ratio before and after a step of adjusting said phase.

6. The process of claim 5 wherein said step of producing an extreme phase adjustment further comprises:

determining that the neighborhood of said extreme phase adjustment has been reached using said count and said ratio comparison; and making a series of fine adjustments to said phase until said extreme phase adjustment has been produced.

7. The process of claim 1 further comprising the steps of:

finding a maximum of said first output;

finding a maximum of said second output;

determining a ratio of said first output maximum to said second output maximum;

determining a scaling factor based on said determined ratio; and applying said determined scaling factor to said phase adjusted received signal and said phase adjusted carrier signal.

8. A process for calibrating a coherent demodulator by determining a phase for phase alignment between a carrier signal and a received signal, said demodulator having a first mixer and a second mixer for producing a first output and a second output, said first output being in phase quadrature with respect to said second output, said process comprising:

finding a maximum value of said first output;

finding a maximum value of said second output determining a ratio of said first output maximum with respect to said second output maximum;

adjusting said phase in steps while said determined ratio is reducing until a minimum value of said ratio is determined, said phase then being a minimum ratio phase;

storing a value of said minimum ratio phase;

adjusting said value of said minimum ratio phase by a predetermined amount to produce a calibrated phase; and applying said calibrated phase to said first output and said second output to give a calibrated received signal and a calibrated carrier signal.

9. The process of claim 8 further comprising:

determining a scalar attribute from said ratio at said calibrated phase; and adjusting an amplitude of said first output and said second output utilizing said scalar attribute.

10. The process of claim 8 wherein said step of applying said calibrated phase comprises:

providing said calibrated phase to said first mixer; and providing said calibrated phase to said second mixer.

11. The process of claim 10 wherein:

said step of providing said calibrated phase to said first mixer comprises:

converting said calibrated phase into a first mixer value utilizing a first mixer table; and modifying said first output by applying said first mixer value in said first mixer;

said step of providing said calibrated phase to said second mixer comprises:

converting said calibrated phase into a second mixer value utilizing a second mixer table; and modifying said second output by applying said second mixer value in said second mixer.

* * * * *